VS009479643B1

United States Patent
Abuelsaad et al.

(10) Patent No.: US 9,479,643 B1
(45) Date of Patent: Oct. 25, 2016

(54) LINGUISTIC COORDINATION SYSTEM

(71) Applicant: INTERNATIONAL BUSINESS MACHINES CORPORATION, Armonk, NY (US)

(72) Inventors: Tamer E. Abuelsaad, Somers, NY (US); Gregory J. Boss, Saginaw, MI (US); Brent Hodges, Raleigh, NC (US); John Elbert Moore, Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/740,165

(22) Filed: Jun. 15, 2015

(51) Int. Cl.
*H04M 1/64* (2006.01)
*H04M 3/523* (2006.01)
*H04M 3/22* (2006.01)
*H04M 3/42* (2006.01)

(52) U.S. Cl.
CPC ......... *H04M 3/5233* (2013.01); *H04M 3/2218* (2013.01); *H04M 3/42221* (2013.01)

(58) Field of Classification Search
CPC .................................................. H04M 3/5233
See application file for complete search history.

(56) References Cited

U.S. PATENT DOCUMENTS

| 7,349,843 | B1* | 3/2008 | Beck .................. H04M 3/51 379/265.12 |
| 7,539,296 | B2 | 5/2009 | Basson et al. |
| 8,386,252 | B2 | 2/2013 | Michaelis |
| 8,837,687 | B2 | 9/2014 | Odinak et al. |
| 2004/0096050 | A1* | 5/2004 | Das .................... H04M 3/5233 379/265.12 |
| 2014/0140496 | A1 | 5/2014 | Ripa et al. |
| 2014/0270143 | A1* | 9/2014 | Upadhyaya ........ H04M 3/5233 379/265.12 |
| 2016/0036980 | A1* | 2/2016 | Ristock .............. H04M 3/5233 379/265.12 |
| 2016/0182722 | A1* | 6/2016 | Neidermyer ....... H04M 3/5233 379/265.12 |

* cited by examiner

*Primary Examiner* — Joseph T Phan
(74) *Attorney, Agent, or Firm* — Cahn & Samuels, LLP

(57) ABSTRACT

An embodiment of the invention routes a call from a caller to a select agent with a controller, the call being routed based on a caller profile of the caller and a regional profile. A processor can generate a new call record for the call between the caller and the select agent, the new call record including caller attributes and agent attributes. A detector can monitor the call between the caller and the select agent, the call being monitored for communication barriers. The communication barriers can include words and/or phrases that indicate a misunderstanding, and/or repetition of the same phrase. The processor can update the caller's profile and/or the regional profile, the caller's profile and/or regional profile being updated with the new call record.

20 Claims, 16 Drawing Sheets

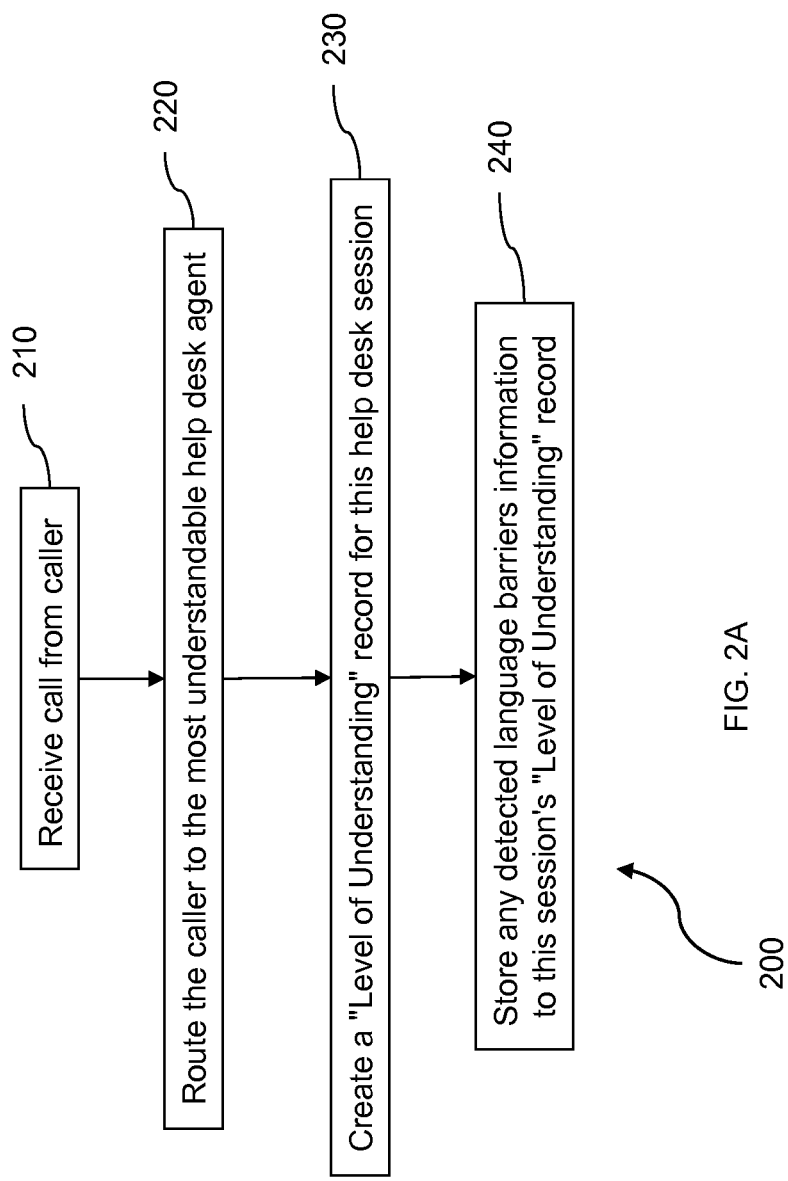

Example of an LOU (Level of Understanding) Matrix
Caller 1

| | Agent A | | | | |
|---|---|---|---|---|---|
| | # requests for restatement | Average # consecutive requests | # of requests for to be transferred | # of times caller restates agent | Length of Call | Calculation/Total Level of Understanding |
| Conversation on Apr 1, 2014 @ 10am | 4 | 2.2 | 0 | 4 | 22 mins | Low |
| Conversation on Apr 3, 2014 @ 1pm | 3 | 1.8 | 1 | 3 | 14 mins | Medium |
| Conversation on Apr 4, 2014 @ 2pm | 6 | 1.5 | 1 | 6 | 12 mins | Low |

FIG. 2B

| Caller Language Attribute | Agent Language Attribute | | | | | |
|---|---|---|---|---|---|---|
| | Native A' – Region A1 | Native A' - Region A2 | Native A' - Region A3 | Native B' | Native C' | Native D' |
| Native A' – Region A1 | | Med | High | Med | Low | High |
| Native A' - Region A2 | High | | Low | Med | Extremely Low | Low |
| Native A' - Region A3 | High | High | | High | Med | Low |
| Native B' | Low | Med | Low | | Med | Med |
| Native C' | Low | Med | Med | Med | | High |
| Native D' | High | Low | Med | Med | Low | |

FIG. 3C

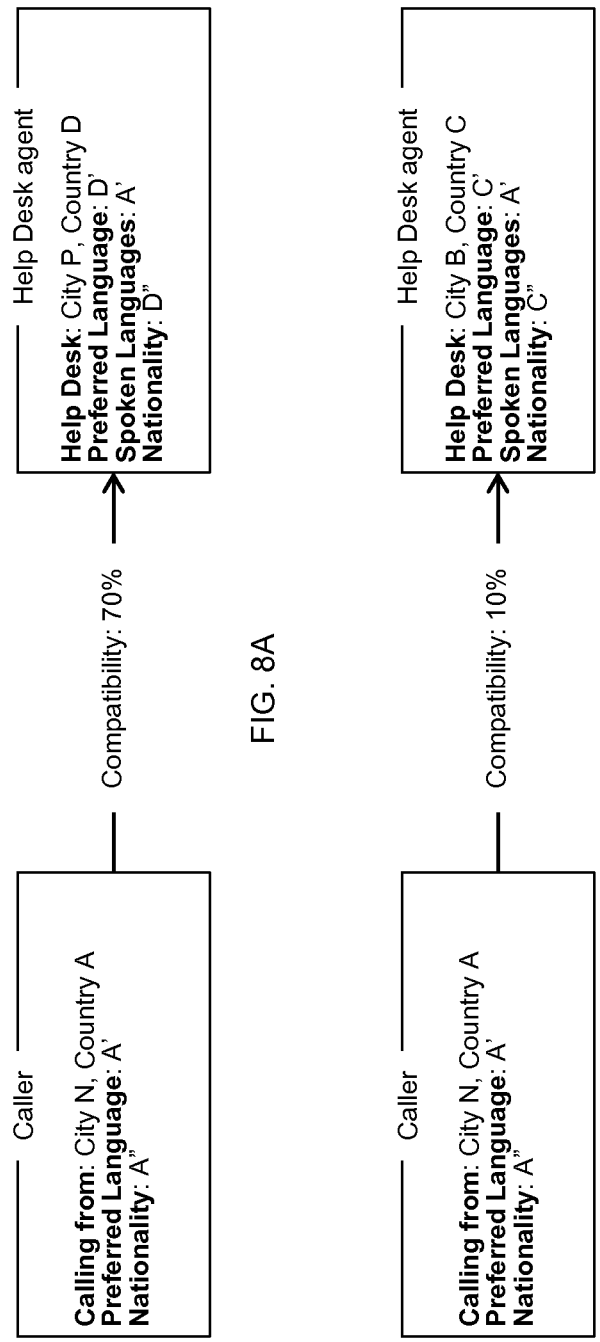

US 9,479,643 B1

LINGUISTIC COORDINATION SYSTEM

BACKGROUND

The present invention relates to linguistic coordination, and more particularly to systems, methods, and computer program products for linguistic coordination that matches callers and help desk agents by detecting and analyzing language compatibility and level of understanding (LOU).

Many of today's business enterprises blend their resources from disparate locations around the world, such as a business help desk function. A caller seeking help desk support is very likely to communicate with someone in a geographically remote area and often in a different country and time zone.

SUMMARY OF THE INVENTION

An embodiment of the invention provides a method for matching callers and agents, the method including routing a call from a caller to a select agent with a controller, the call being routed based on a caller profile of the caller and a regional profile. The caller profile can include call records between the caller and agents, each call record including an agent location, an agent preferred language, and the number of communication barriers experienced during a call with the caller. The regional profile can include the number of communication barriers experienced between regional callers and regional agents, the regional callers including callers that share the same nationality and language as the caller, the regional agents including agents that share the same nationality and language as the select agent.

A processor can generate a new call record for the call between the caller and the select agent, the new call record including caller attributes and agent attributes. A detector can monitor the call between the caller and the select agent, the call being monitored for communication barriers. The communication barriers can include words and/or phrases that indicate a misunderstanding, and/or repetition of the same phrase. The processor can update the caller's profile and/or the regional profile, the caller's profile and/or regional profile being updated with the new call record.

BRIEF DESCRIPTION OF THE SEVERAL VIEWS OF THE DRAWINGS

The present invention is described with reference to the accompanying drawings. In the drawings, like reference numbers indicate identical or functionally similar elements.

FIG. 2A is a flow diagram illustrating a method to store a help desk call/session level of understanding between a caller and a help desk agent according to an embodiment of the invention.

FIG. 2B illustrates an exemplary LOU matrix between Caller 1 and Agent A according to an embodiment of the invention.

FIG. 3C illustrates a summary of understanding matrix according to an embodiment of the invention.

FIGS. 8A and 8B are diagrams illustrating stored universal summary of compatibility database entries for callers according to an embodiment of the invention.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention automatically detects barriers to communication, correlates caller and help desk agent attributes (e.g., geographical region), and, based on those attributes, routes callers to the most understandable (most suitable) help desk agent. Agent/caller compatibility ratings and/or "level of understanding" (LOU) ratings can be generated; and, both repeat and new callers can be optimally matched to agents based on geography, language accents, voice cadence, and other attributes.

In at least one embodiment, the system monitors conversations for words and phrases which indicate a lack of understanding, e.g., phrases such as, "would you repeat that?", or "I don't understand." The system can also monitor for the repetition of the same phrase, which can be another indication of misunderstanding.

Figure 1:
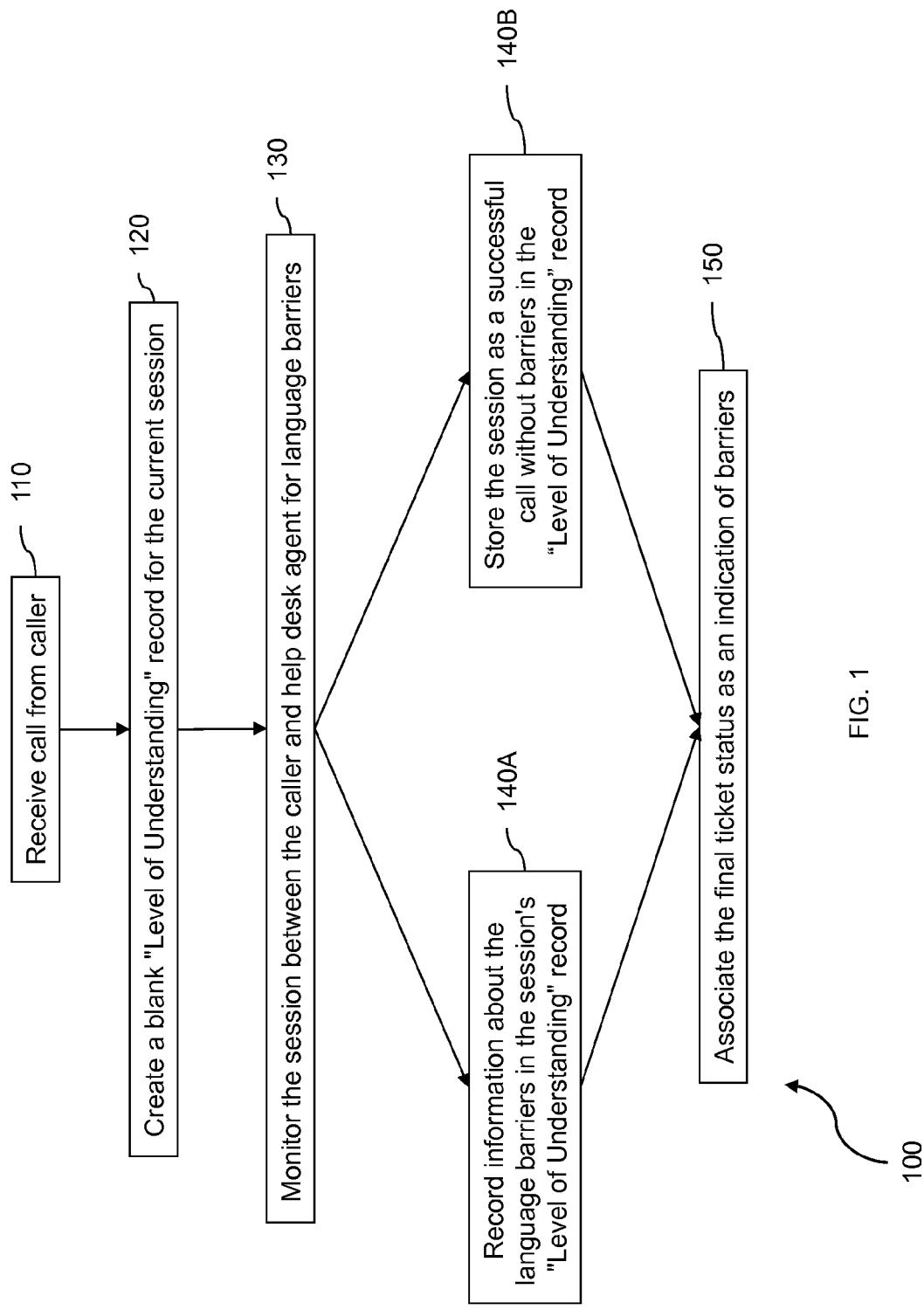
FIG. 1 is a flow diagram illustrating a method to detect language barriers between a help desk agent and a caller during a help desk call according to an embodiment of the invention.

FIG. 1 is a flow diagram illustrating a method 100 to detect language barriers between an agent and a caller during a help desk call according to an embodiment of the invention. As used herein, the term "agent" or "help desk agent" can include help desk agents and customer service agents. The caller contacts help desk and self identifies (e.g., by speaking his legal name, user name, or identification number) 110. The system creates a blank "Level of Understanding" record for the current session 120 and monitors the session between the caller and help desk agent for language barriers 130. In at least one embodiment, prior "Level of Understanding" records are associated with a caller, telephone number, and/or customer ID to assist in selecting an agent. Words or phrases that indicate a misunderstanding (e.g., "would you repeat that?", "I am sorry I don't understand") and/or repetition of the same phrase multiple times may indicate a language barrier.

If a language barrier is detected, the system records information about the language barrier in the session's "Level of Understanding" record (see method 200, below) 140A. If a language barrier is not detected, the session is stored as a successful call without barriers in the "Level of Understanding" record 140B. The system associates the final ticket status (e.g., Open, Escalated, Transferred, Closed, etc.) as one indication of how much of a barrier the items in #140A were 150.

FIG. 2A is a flow diagram illustrating a method 200 to store a help desk call/session "Level of Understanding" between a caller and a help desk agent according to an embodiment of the invention. The caller contacts the help desk and self identifies 210. The system routes the caller to the most understandable help desk agent 220 (see methods 400 and 500, below).

The system creates a "Level of Understanding" record for this help desk session 230, which can include: the caller's attributes from their individual "summary of compatibility" record (see method 500, step 540); the help desk agent's badge ID (or other identifier), geographic location, and/or nationality; the number of phrases spoken that request a restatement (e.g., "could you repeat that", "say again"); the number of consecutive requests for a restatement (e.g., the caller asked agent to repeat the same thing 3 times in a row); the number of requests to be transferred to another agent; and/or the number of times a caller restates what the agent said (e.g., "did you say to do this . . . "). At the conclusion of the call, the system stores any detected language barriers information (see method 100) to this session's "Level of Understanding" record 240. This information will be used for future routing of this caller and other callers similar to him or her. For example, the caller is from country A and the agent is from country X. If the LOU record for the caller and the agent is above a threshold rating, then another caller from country A will be routed to the agent (or another agent from country X). If the LOU record for the caller and the agent is below a threshold rating, then another caller from country A will not be routed to the agent (or another agent from country X).

FIG. 2B illustrates an exemplary LOU matrix (also referred to herein as an "LOU record") between Caller 1 and Agent A according to an embodiment of the invention. During a conversation on Apr. 1, 2014 at 10:00 AM, Caller 1 made 4 requests for restatement, the average number of consecutive requests for a restatement was 2.2, the number of requests to be transferred was 0, the number of times the caller restated the agent was 4, the length of the call was 22 minutes. The system can have a threshold number of requests for restatement (e.g., 2), a threshold average number of consecutive requests for a restatement (e.g., 2), a threshold number of requests to be transferred (e.g., 1), and/or a threshold number of times the caller restated the agent (e.g., 3). When a threshold number of thresholds (e.g., 2) are exceeded, the calculation/total level of understanding is low. When the threshold number of thresholds is not exceeded, the calculation/total level of understanding is high; and, when the number of thresholds equals the threshold number of thresholds, the calculation/total level of understanding is medium. In this example, 3 out of 4 thresholds are exceeded, thus the calculation/total level of understanding is low.

During a conversation on Apr. 3, 2014 at 1:00 PM, Caller 1 made 3 requests for restatement, the average number of consecutive requests for a restatement was 1.8, the number of requests to be transferred was 1, the number of times the caller restated the agent was 3, the length of the call was 14 minutes, and the calculation/total level of understanding was medium. During a conversation on Apr. 4, 2014 at 2:00 PM, Caller 1 made 6 requests for restatement, the average number of consecutive requests for a restatement was 1.5, the number of requests to be transferred was 1, the number of times the caller restated the agent was 6, the length of the call was 12 minutes, and the calculation/total level of understanding was low.

Figures 3A, 3B:
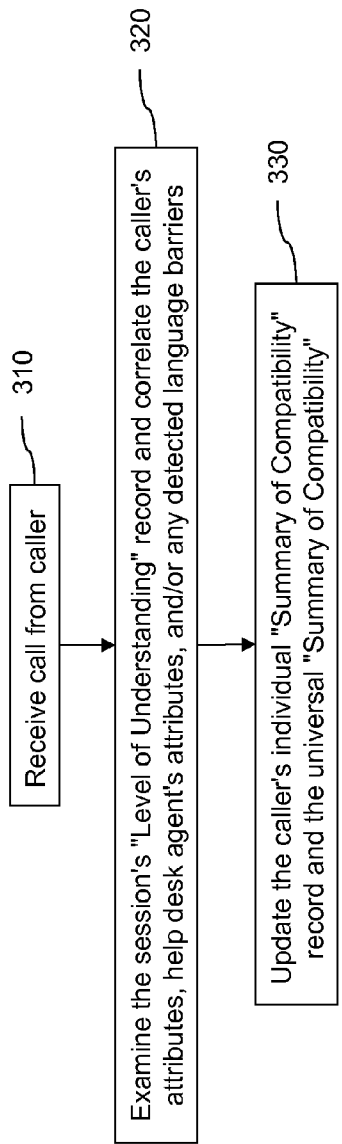
FIG. 3A is a flow diagram illustrating a method to summarize compatibility of help desk agents with callers according to an embodiment of the invention.
FIG. 3B illustrates a summary of understanding matrix according to an embodiment of the invention.

FIG. 3A is a flow diagram illustrating a method 300 to summarize compatibility of help desk agents with callers according to an embodiment of the invention, wherein the system correlates the help desk agents' and callers' attributes from their "Summary of Compatibility" with their "Level of Understanding". The caller contacts the help desk and self identifies 310. At the conclusion of the call, the system examines the session's "Level of Understanding" record and correlates the caller's attributes (e.g., geographic region—Country A), the help desk agent's attributes (e.g., geographic region—country B), and/or any detected language barriers (see method 100, step 130) 320. The system updates the caller's individual "Summary of Compatibility" record and the universal (generalizations made by examining all caller/help desk agent pairs) "Summary of Compatibility" 330.

FIG. 3B illustrates a summary of understanding matrix (actual measured values) example according to an embodiment of the invention. Caller 1 has a low summary of understanding with Agent A, a medium summary of understanding with Agent B, a high summary of understanding with Agent C, and a high summary of understanding with Agent D.

Caller 2 has a high summary of understanding with Agent A, a medium summary of understanding with Agent B, a low summary of understanding with Agent C, and a low summary of understanding with Agent D. Caller 3 has a high summary of understanding with Agent A, a low summary of understanding with Agent B, a medium summary of understanding with Agent C, and a medium summary of understanding with Agent D.

FIG. 3C illustrates an exemplary summary of understanding matrix (generalized) according to an embodiment of the invention. Callers from Region 1, Country A having a native language of A' have a medium summary of understanding with agents from the Region 2, Country A having a native language of A', a high summary of understanding with agents from the Region 3, Country A having a native language of A', a medium summary of understanding with agents having a native language of B' a low summary of understanding with agents having a native language of C', and a high summary of understanding with agents having a native language of D'.

Callers from the Region 2, Country A having a native language of A' have a high summary of understanding with agents from Region 1, Country A having a native language of A', a low summary of understanding with agents from the Region 3, Country A having a native language of A', a medium summary of understanding with agents having a native language of B', an extremely low summary of understanding with agents having a native language of C', and a low summary of understanding with agents having a native language of D'.

Callers from the Region 2, Country A having a native language of A' have a high summary of understanding with agents from the Region 1, Country A having a native language of A', have a high summary of understanding with agents from the Region 2, Country A having a native language of A', a high summary of understanding with agents having a native language of B', a medium summary of understanding with agents having a native language of C', and a low summary of understanding with agents having a native language of D'.

Callers having a native language of B' have a low summary of understanding with agents from the Region 1, Country A having a native language of A', have a medium summary of understanding with agents from the Region 2, Country A having a native language of A', a low summary of understanding with agents from the Region 3, Country A having a native language of A', a medium summary of understanding with agents having a native language of C', and a medium summary of understanding with agents having a native language of D'.

Callers having a native language of C' have a high summary of understanding with agents from the Region 1, Country A having a native language of A', have a low summary of understanding with agents from the Region 2, Country A having a native language of A', a medium summary of understanding with agents from the Region 3, Country A having a native language of A', a medium summary of understanding with agents having a native language of B', and a high summary of understanding with agents having a native language of D'.

Callers having a native language of D' have a high summary of understanding with agents from the Region 1, Country A having a native language of A', have a low summary of understanding with agents from the Region 2, Country A having a native language of A', a medium summary of understanding with agents from the Region 3, Country A having a native language of A', a medium summary of understanding with agents having a native language of B', and a low summary of understanding with agents having a native language of C'.

Figure 4:
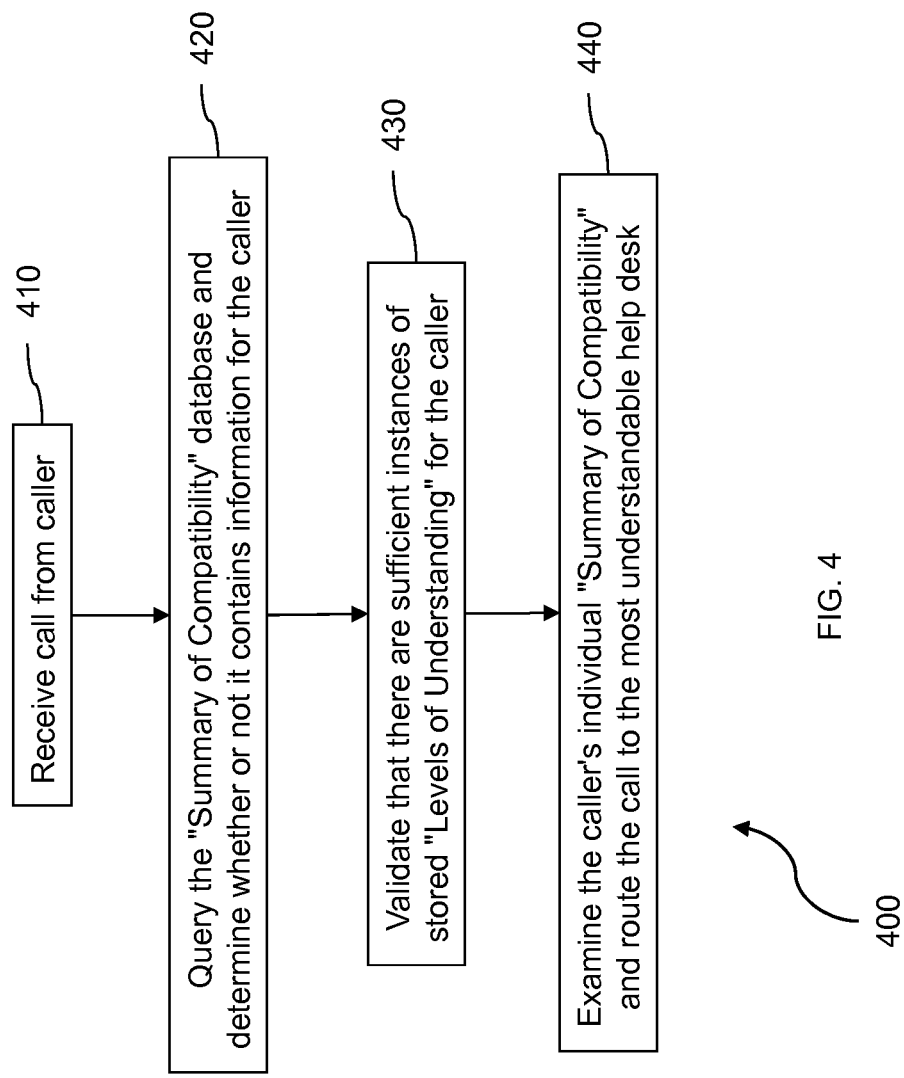
FIG. 4 is a flow diagram illustrating a method to route repeat callers to understandable help desk agents based on stored summary of compatibility results according to an embodiment of the invention.

FIG. 4 is a flow diagram illustrating a method 400 to route repeat callers to understandable help desk agents based on stored "Summary of Compatibility" results according to an embodiment of the invention. A caller contacts the help desk and self identifies 410. The system queries the "Summary of Compatibility" database and determines whether or not it contains information for the caller 420. If the "Summary of Compatibility" database does not contain information for the caller, then the system proceeds to method 500 (item 530), discussed below. If the "Summary of Compatibility" database contains information for the caller, the system validates that there are sufficient instances of stored "Levels of Understanding" for the caller 430. If there are not sufficient instances of stored "Levels of Understanding" for the caller (e.g., below a threshold number), then the system proceeds to method 500, discussed below.

The system examines the caller's individual "Summary of Compatibility" and routes the call to the most understandable help desk 440. For example, the system found that the caller has been routed to help desks in Country E and Country C and did not have issues, while there were issues when the caller was routed to a help desk in Country D. Thus, the system routes the caller to a help desk in Country E or Country C, and not to a help desk in Country C. In another example, the system identifies that the caller experienced linguistic incompatibility with specific help desk agents in Country D, but not all help desk agents in Country D. The system routes the caller to help desk agents in Country D other than the ones he experienced trouble understanding. In yet another example, the system summarizes that 90% of callers from Country A have issues understanding help desk agents 1, 2, and 5. The system ensures that callers from Country A are routed to other help desk agents.

Figure 5:
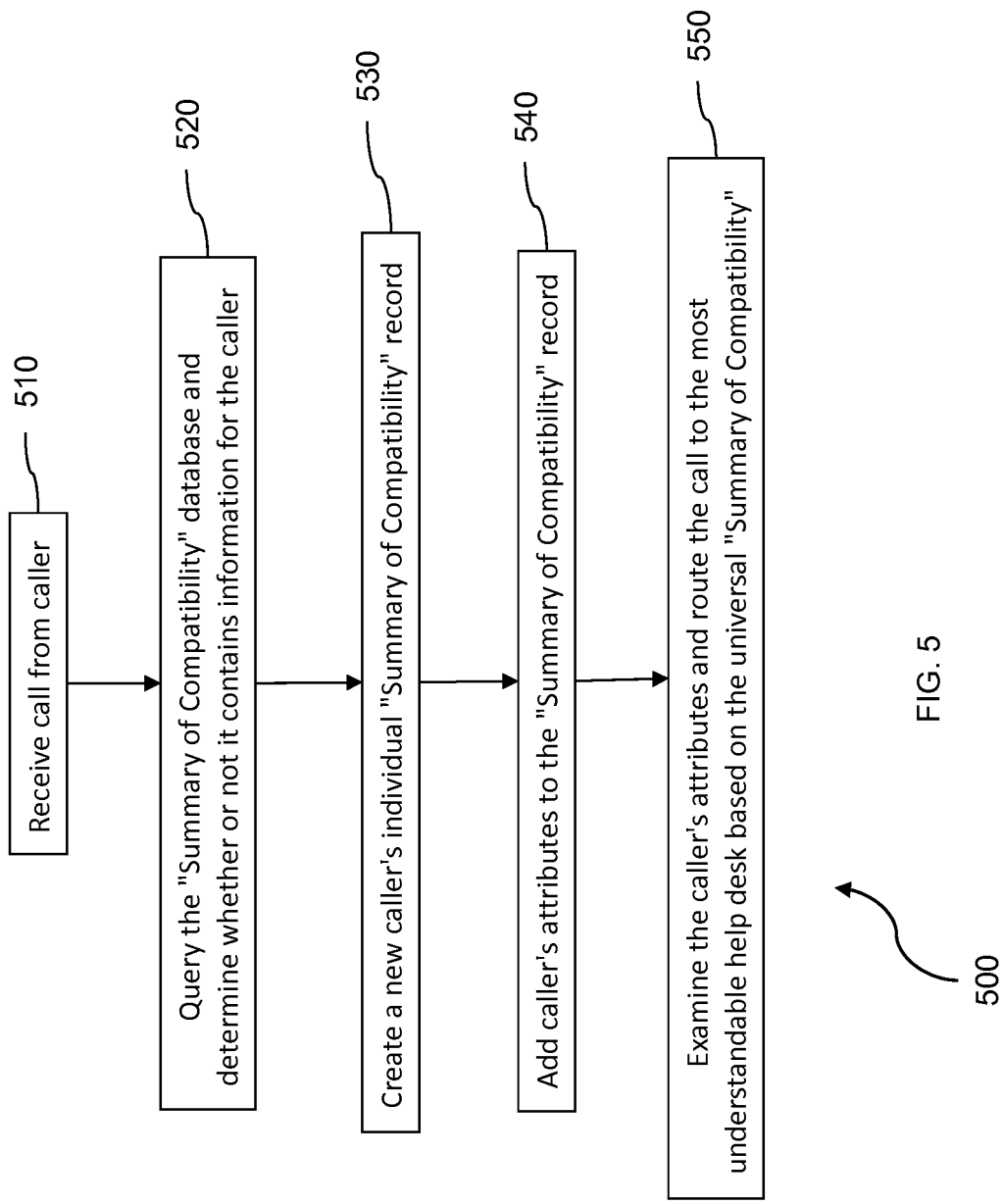
FIG. 5 is a flow diagram illustrating a method to route a new caller's call to an understandable help desk agent according to an embodiment of the invention.

FIG. 5 is a flow diagram illustrating a method 500 to route a new caller's call to an understandable help desk agent according to an embodiment of the invention. The system can route the call based on pre-calculated universal "Summary of Compatibility" of similar callers' (e.g., satisfies a threshold degree of similarity (e.g., same geolocation)) universal "Summary of Compatibility", which can be calculated by the help desk back-end system. In at least one embodiment, a "Summary of Compatibility" includes the number of barriers experienced in a call between a caller and agent. When the number of barriers is above a threshold (e.g., 5), the call summary is "Barriers"; and, when the number of barriers is below the threshold (or a second threshold), the call summary is "Success". The system can examine stored "Summary of Compatibility" records for patterns. For example, if 70% of New York callers have trouble communicating with help desks in Country C, then 70% is a configurable threshold. Such generic observations can be used to route a new caller where the system does not have a profile on the caller other than his or her basic attributes, such as, geographic location, native language, preferred language, nationality, etc.

The caller contacts help desk and self identifies 510. The system queries the "Summary of Compatibility" database and determines whether or not it contains information for the caller 520. If the "Summary of Compatibility" database contains information for the caller, then the system proceeds with method 400, discussed above. If the "Summary of Compatibility" database does not contain information for the caller, then the system creates a new caller's individual "Summary of Compatibility" record 530. The system adds caller's attributes to the "Summary of Compatibility" record 540, such as, for example, a caller identifier (e.g., name, user name, phone number, etc.), geographic location, nationality, etc. The system examines the caller's attributes and routes the call to the most understandable help desk based on the universal "Summary of Compatibility" 550.

Figure 6:
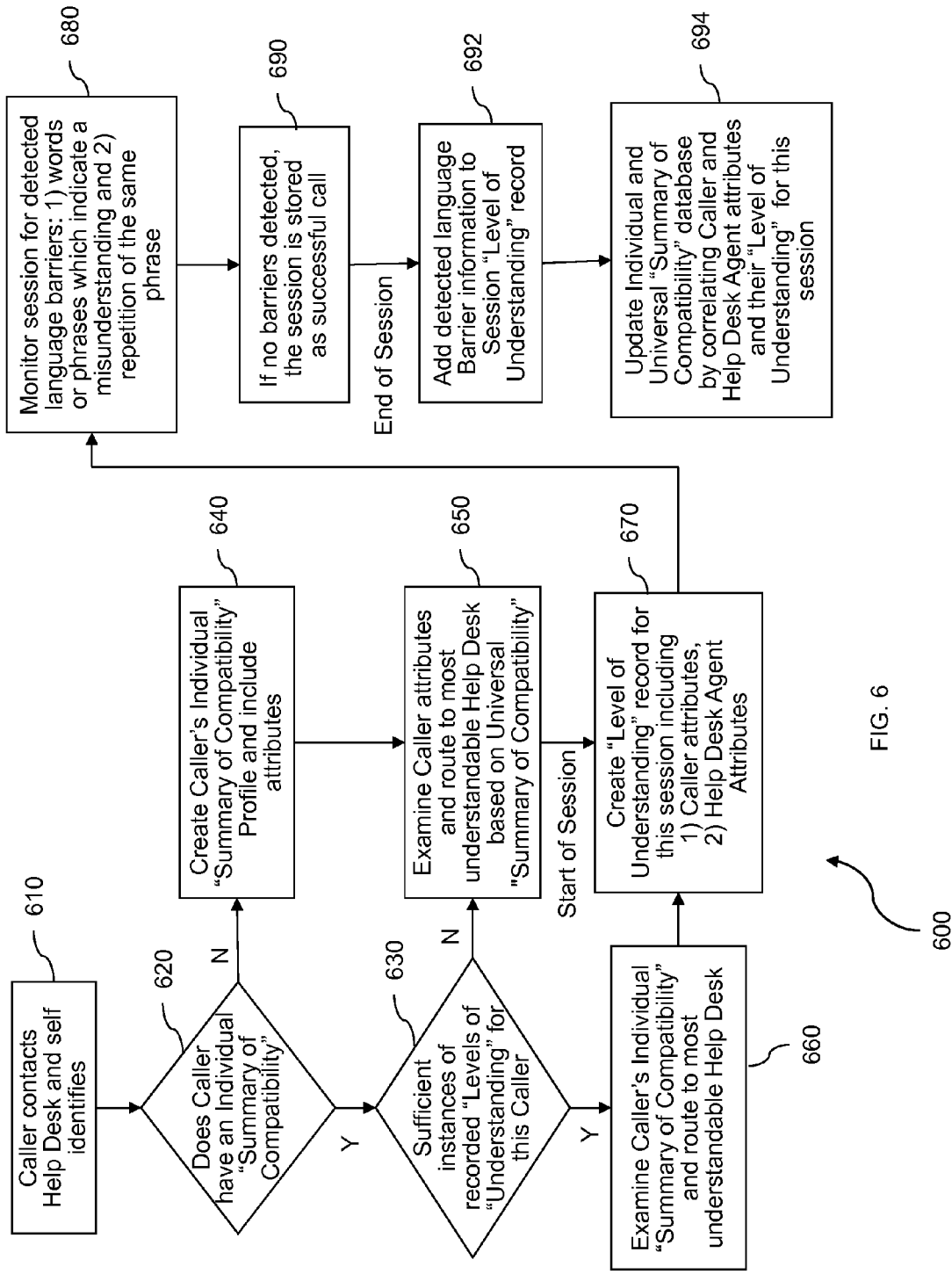
FIG. 6 is a flow diagram illustrating a method for linguistic coordination according to an embodiment of the invention.

FIG. 6 is a flow diagram illustrating a method 600 according to an embodiment of the invention that combines items illustrated in FIGS. 1-5. A caller contacts a help desk and self identifies 610; and, the system determines whether the caller has an individual "Summary of Compatibility" 620. This can, for example, correspond to steps in the methods illustrated in FIGS. 4 and 5. When the caller has an individual "Summary of Compatibility", then the system determines whether there are sufficient instances of recorded "Levels of Understanding" for the caller 630. This can correspond to steps in the methods illustrated in FIGS. 4 and 5. When the caller does not have an individual "Summary of Compatibility", then the system creates the caller's individual "Summary of Compatibility" profile and includes attributes 640. This can correspond to the method illustrated in FIG. 5.

When there are not sufficient instances of recorded "Levels of Understanding" for the caller, the system examines the caller attributes and routes the caller to the most understandable help desk based on a universal "Summary of Compatibility" 650. This can correspond to method 500. When there are sufficient instances of recorded "Levels of Understanding" for the caller, the system examines the caller's individual "Summary of Compatibility" and routes the caller to the most understandable help desk 660. This can correspond to method 400.

The system creates a "Level of Understanding" record for this session including caller attributes and help desk agent attributes 670. This can correspond to method 200. The system monitors the session for detected language barriers, such as words or phrases which indicate a misunderstanding and/or repetition of the same phrase 680. This can correspond to method 100. When no language barriers are detected, or if the number of language barriers are below a threshold number of language barriers, the system stores the session as a successful call 690.

The system adds detected language barrier information to session "Level of Understanding" record 692. This can correspond to method 200. The system updates individual and universal "Summary of Compatibility" databases by correlating caller and help desk agent attributes and their "Level of Understanding" for this session 694. This can correspond to method 300.

Figure 7A:
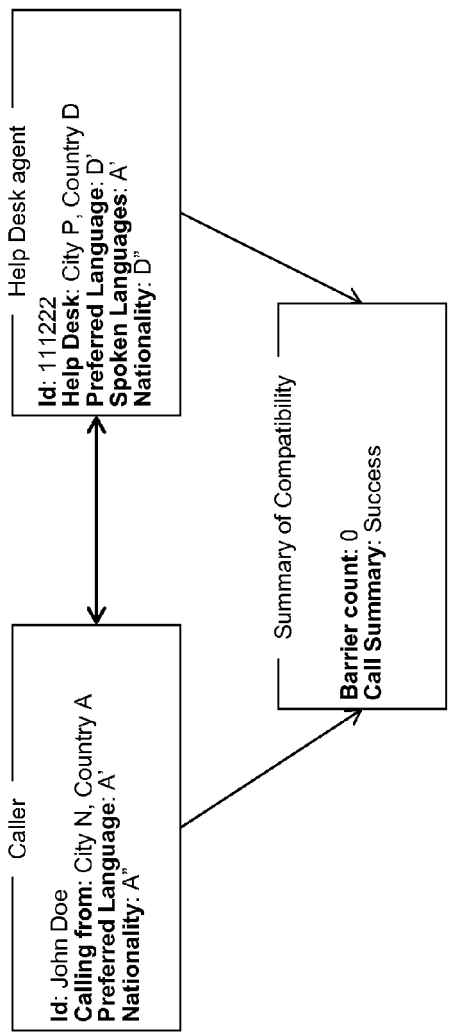
FIGS. 7A and 7B are diagrams illustrating stored summary of compatibility database entries for a caller according to an embodiment of the invention.
Figure 7B:
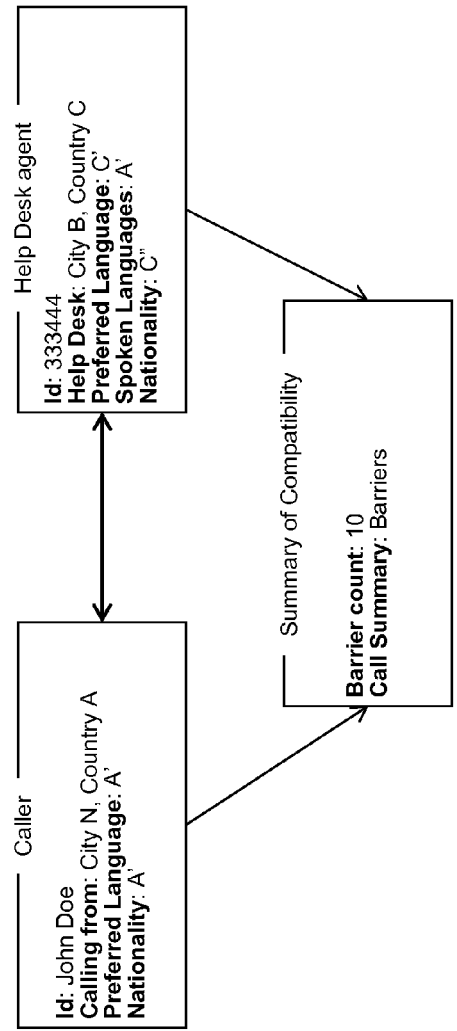

FIGS. 7A and 7B are diagrams illustrating stored "Summary of Compatibility" database entries for caller John Doe according to an embodiment of the invention. Caller John Doe is calling from City N in Country A, has a preferred language of A', and has a nationality of A". In FIG. 7A, help desk agent 111222 is in City P in Country D, speaks language A', has a preferred language of D', and has a nationality of D". During a call between John Doe and help desk agent 111222, zero (0) barriers are encountered and the session is labeled as "Success".

In FIG. 7B, help desk agent 333444 is in City B in Country C, speaks language A', has a preferred language of C', and has a nationality of C". During a call between John Doe and help desk agent 333444, ten (10) barriers are encountered and the session is labeled as "Barriers".

FIGS. 8A and 8B are diagrams illustrating stored universal "Summary of Compatibility" database entries for callers from City N in Country A according to an embodiment of the invention. In FIG. 8A, callers from City N in Country A have 70% compatibility with help desk agents in City P in Country D, that speak language A', have a preferred language of D', and have a nationality of D". In FIG. 8B, callers from City N in Country A have 10% compatibility with help desk agents in City B in Country C, that speak language A', have a preferred language of C', and have a nationality of C".

Figure 9:
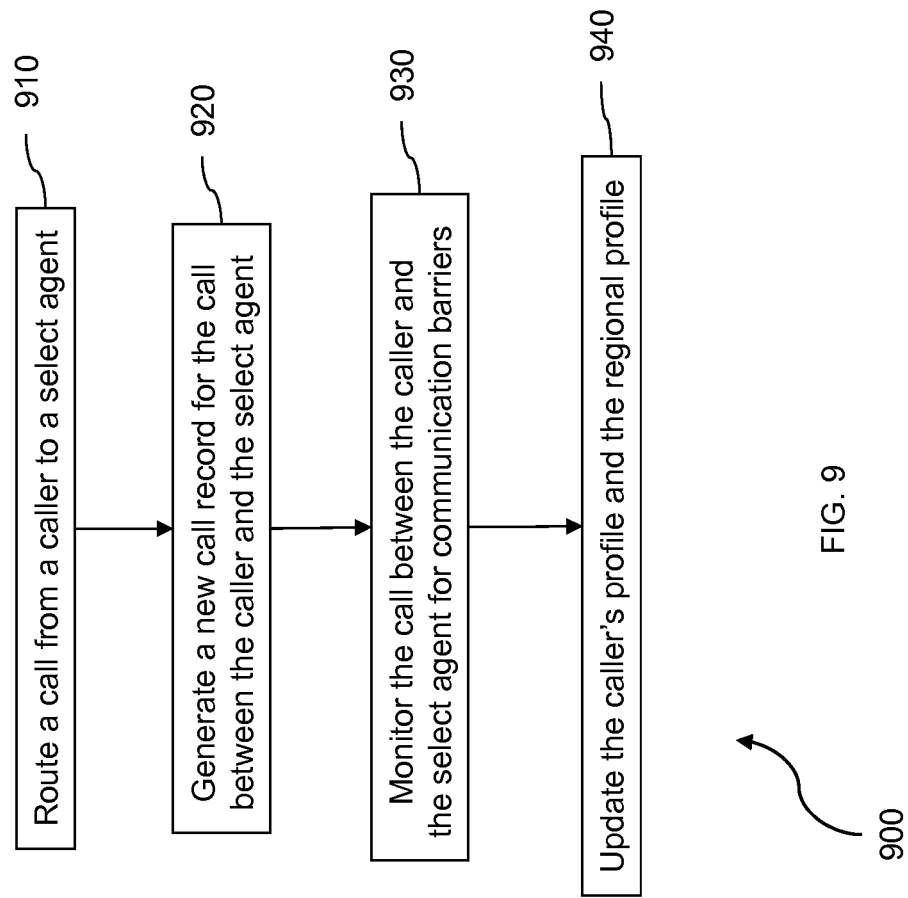
FIG. 9 is a flow diagram illustrating a method to match callers and agents according to an embodiment of the invention.

FIG. 9 is a flow diagram illustrating a method to match callers and agents according to an embodiment of the invention. A controller routes a call from a caller to a select agent 910, the call being routed based on a caller profile of the caller and/or a regional profile. As used herein, the term "controller" can include a computer hardware device (e.g., CPU, microprocessor). The caller profile can include call records between the caller and agents, wherein each call record can include an agent location, an agent preferred language, and the number of communication barriers experienced during the call with the caller. Example call records are illustrated in FIGS. 7A and 7B. The caller profile can includes at least one successful call record with a preferred agent, wherein the successful call record includes a number of communication barriers below a predefined threshold. The routing of the call (i.e., item 910) can include routing the caller to the preferred agent.

For example, the caller profile includes two (2) call records between the caller and agent M; such call records include one (1) total communication barrier; and, the predefined threshold is two (2) communication barriers. Item 910 can route the caller to agent M (i.e., the preferred agent). As used herein, the term "preferred agent" includes an agent having a number or percentage of communication barriers with the caller that is below the predefined threshold.

In at least one embodiment of the invention, the regional profile includes the number of communication barriers experienced between regional callers and regional agents, wherein the regional callers include callers that share the same nationality and language as the caller, and wherein the regional agents include agents that share the same nationality and language as the select agent. For example, the regional profile for regional callers from Region W in Country U and regional agents from Region M in Country P includes 769 total calls, 98 total communication barriers experienced (12.7%), 84 calls that experienced communication barriers (10.9%), and a regional profile score of "low".

In at least one embodiment, a processor determines whether the number of call records in the caller profile is above a threshold number of call records. When the number of call records in the caller profile (e.g., 11) is above the threshold number of call records (e.g., 4), the caller can be routed to the selected agent based on the caller profile. When the number of call records (e.g., 3) in the caller profile is below the threshold number of call records (e.g., 4), the caller can be routed to the selected agent based on the regional profile.

Furthermore, the processor can determine whether a caller profile for the caller is stored in a database. When a caller profile for the caller is saved in the database, the caller can be routed to the selected agent based on the caller profile. When a caller profile for the caller is not saved in the database, the caller can be routed to the selected agent based on the regional profile.

The processor generates a new call record for the call between the caller and the select agent 920. As used herein, the term "processor" can include a computer hardware device (e.g., CPU). The new call record can include caller attributes and agent attributes, such as, for example, nationality, spoken language(s), preferred language(s), city, state, and/or country.

The call between the caller and the select agent is monitored with a detector 930. As used herein, the term "detector" can include a computer hardware device (e.g., CPU, microprocessor). In at least one embodiment, the controller and/or detector are on the processor. The call can be monitored for communication barriers, wherein the communication barriers can include words and/or phrases that indicate a misunderstanding and/or repetition of the same phrase. The words and/or phrases that indicate a misunderstanding can include "would you repeat that", "please repeat", "I don't understand", "what was that", "huh", and "what". The words and/or phrases that indicate a misunderstanding can also include a request to be transferred to another agent.

The caller's profile and/or the regional profile can be updated with the processor 940, wherein the caller's profile and/or the regional profile is updated with the new call record. The processor can store identified communication barriers in the new call record and identify the call between the caller and the select agent as a successful call in the new call record when there are no identified communication barriers.

Figure 10:
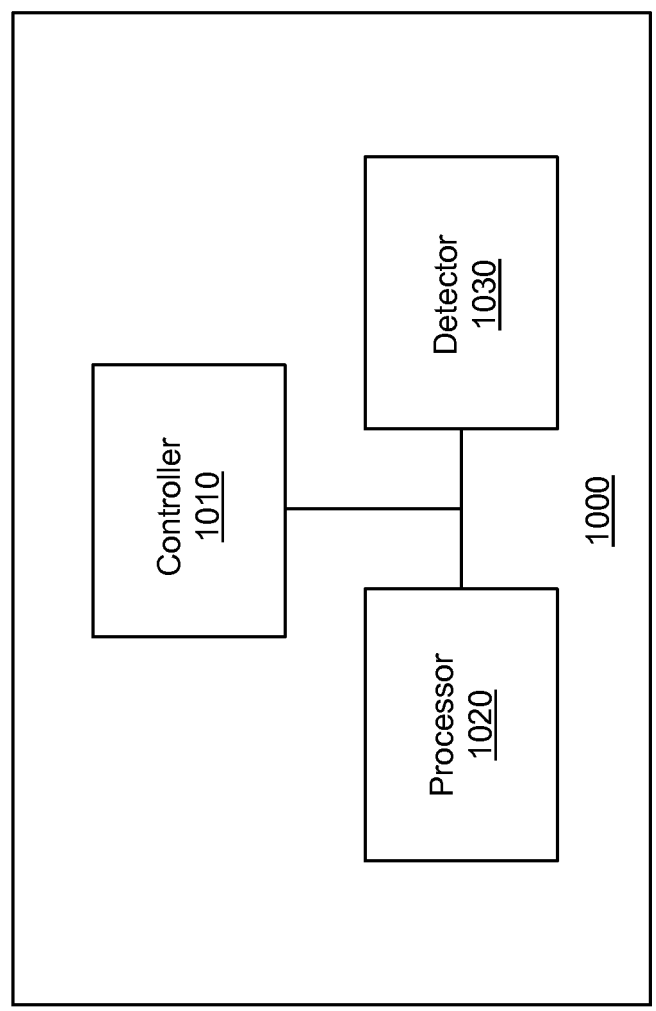
FIG. 10 is a hardware diagram illustrating a system to match callers and agents according to an embodiment of the invention.

FIG. 10 is a hardware diagram illustrating a system 1000 to match callers and agents according to an embodiment of the invention, wherein the system 1000 can include a controller 1010, a processor 1020, and a detector 1030. The controller 1010 routes a call from a caller to a select agent based on a caller profile of the caller and/or a regional profile. The caller profile can include call records between the caller and agents, wherein each call record can include an agent location, an agent preferred language, and a number of communication barriers experienced during a call with the caller. The caller profile can include at least one successful call record with a preferred agent, wherein the successful call record includes a number of communication barriers below a predefined threshold, and wherein the controller 1010 routes the caller to the preferred agent. The regional profile can include the number of communication barriers experienced between regional callers and regional agents, wherein the regional callers include callers that share the same nationality and language as the caller, and wherein the regional agents include agents that share the same nationality and language as the select agent.

The processor 1020 can be connected to the controller 1010, wherein the processor 1020 can generate a new call record for the call between the caller and the select agent, the new call record including caller attributes and agent attributes. As used herein, the term "connected" can include operationally connected, logically connected, in communication with, physically or wirelessly connected, engaged, coupled, contacts, linked, affixed, and attached.

In at least one embodiment, the detector 1030 is connected to the processor 1020, wherein the detector 1030 monitors the call between the caller and the select agent for communication barriers. The communication barriers can include words and/or phrases that indicate a misunderstanding and/or repetition of the same phrase. The words and/or phrases that indicate a misunderstanding can include: would you repeat that, please repeat, I don't understand, what was that, huh, what, and a request to be transferred to another agent. The processor 1020 can update the caller's profile and the regional profile with the new call record.

The processor 1020 can determine whether the number of call records in the caller profile is above a threshold number of call records. The controller 1010 can route the caller to the selected agent based on the regional profile when the number of call records in the caller profile is below the threshold number of call records. The controller 1010 can route the caller to the selected agent based on the caller profile when the number of call records in the caller profile is above the threshold. Furthermore, the processor 1020 can determine whether a caller profile for the caller is stored in an electronic database. The controller 1010 can route the caller to the selected agent based on the caller profile when the caller profile for the caller is saved in the electronic database. The controller 1010 can route the caller to the selected agent based on the regional profile when a caller profile for the caller is not saved in the electronic database.

The processor 1020 can store identified communication barriers in the new call record. Moreover, the processor 1020 can identify the call between the caller and the select agent as a successful call in the new call record when there are no identified communication barriers.

Figure 11:
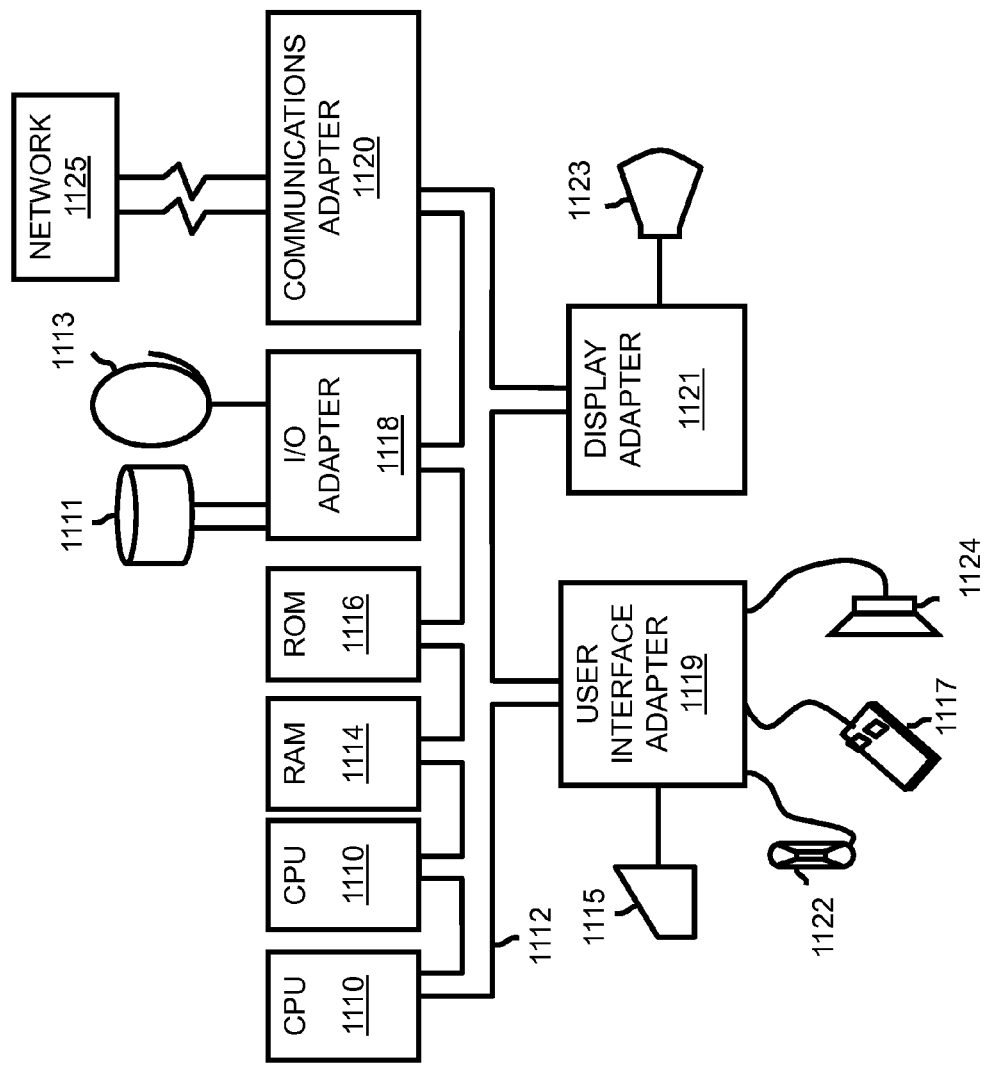
FIG. 11 is a hardware diagram illustrating a computer program product to match callers and agents according to an embodiment of the invention.

Referring to FIG. 11, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 1110. The CPUs 1110 are interconnected with system bus 1112 to various devices such as a random access memory (RAM) 1114, read-only memory (ROM) 1116, and an input/output (I/O) adapter 1118. The I/O adapter 1118 can connect to peripheral devices, such as disk units 1111 and tape drives 1113, or other program storage devices that are readable by the system. The system can read the inventive instructions on the program storage devices and follow these instructions to execute the methodology of at least one embodiment of the invention. The system further includes a user interface adapter 1119 that connects a keyboard 1115, mouse 1117, speaker 1124, microphone 1122, and/or other user interface devices such as a touch screen device (not shown) to the bus 1112 to gather user input. Additionally, a communication adapter 1120 connects the bus 1112 to a data processing network 1125, and a display adapter 1121 connects the bus 1112 to a display device 1123 which may be embodied as an output device such as a monitor, printer, or transmitter, for example.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.'

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
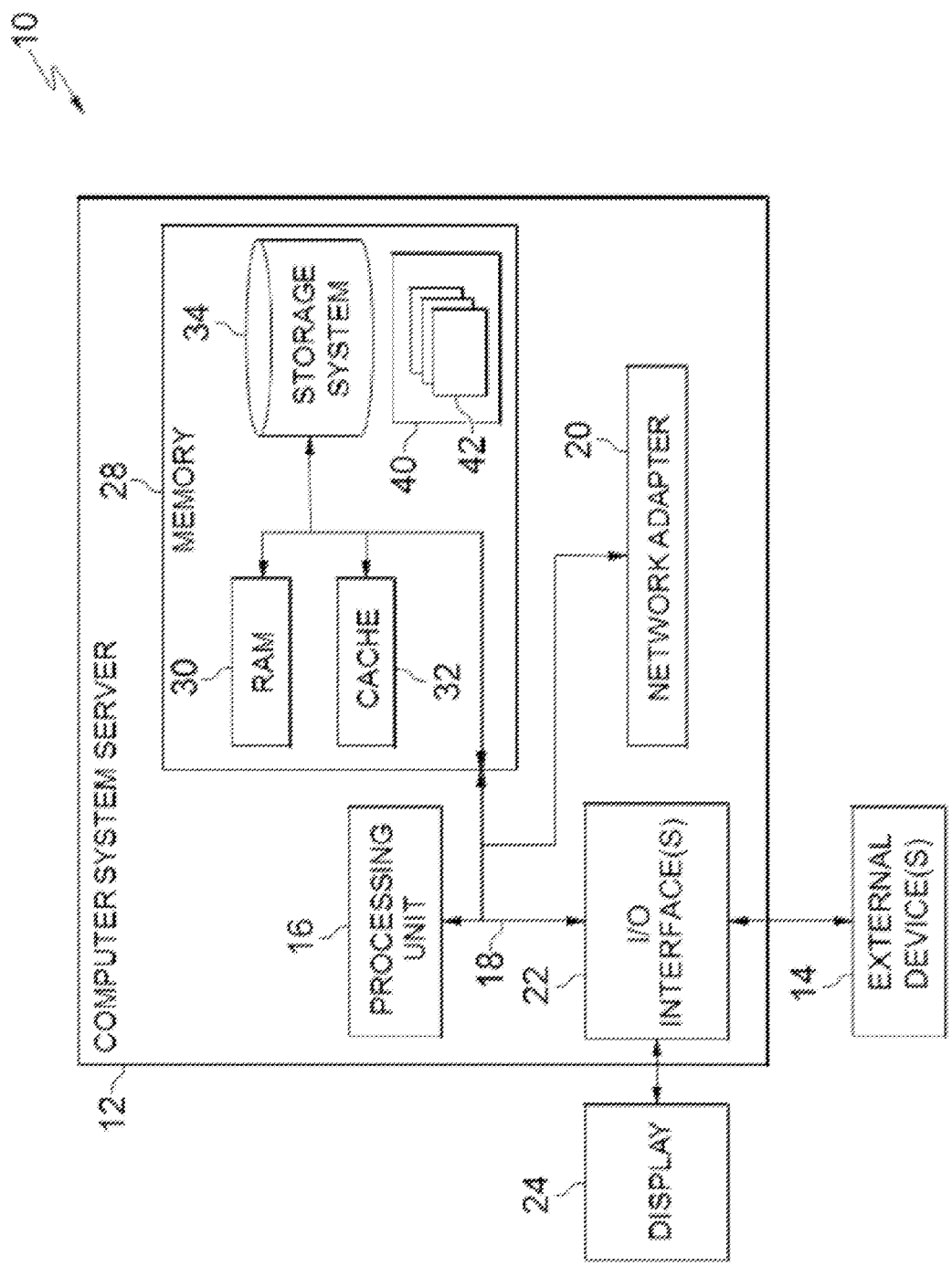
FIG. 12 depicts a cloud computing node according to an embodiment of the present invention.

Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer systemexecutable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 13:
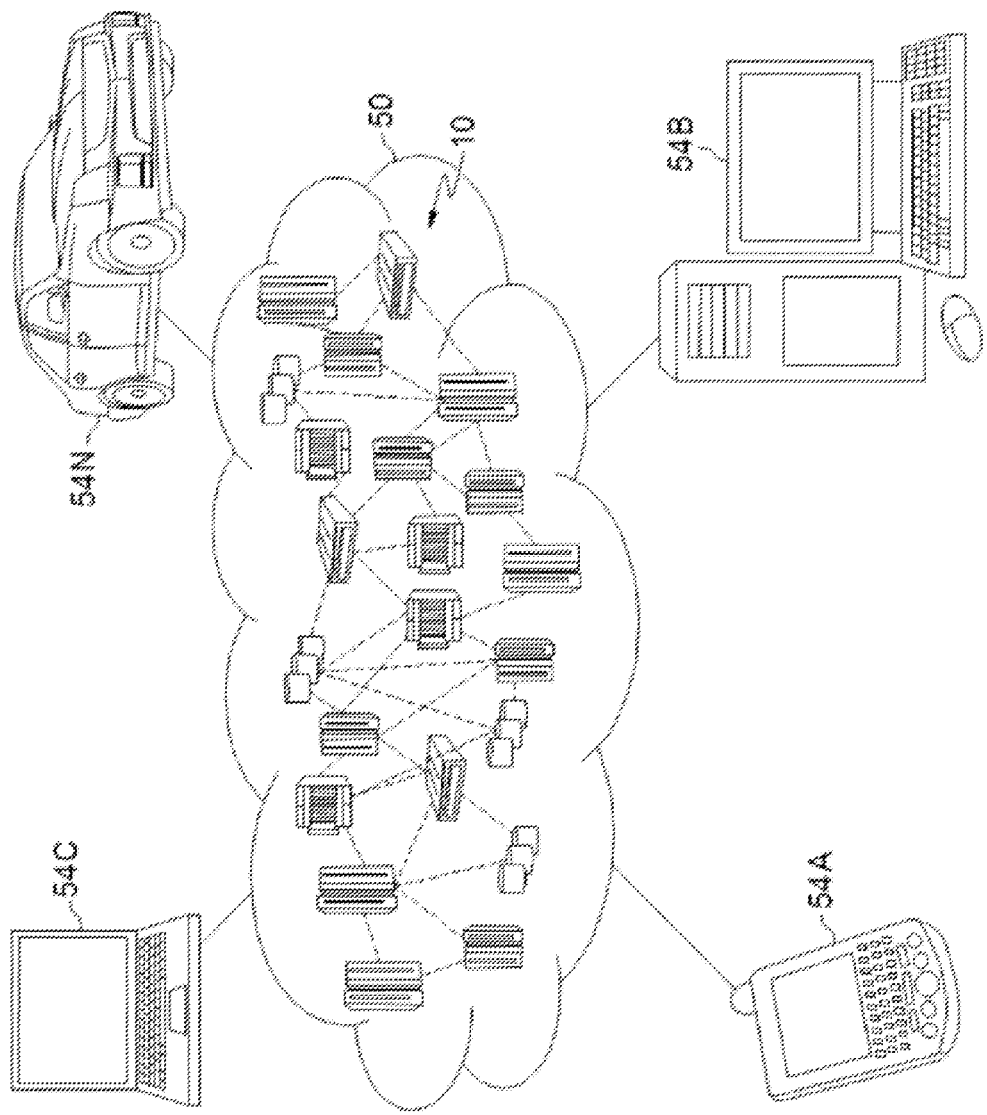
FIG. 13 depicts a cloud computing environment according to an embodiment of the present invention.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 14:
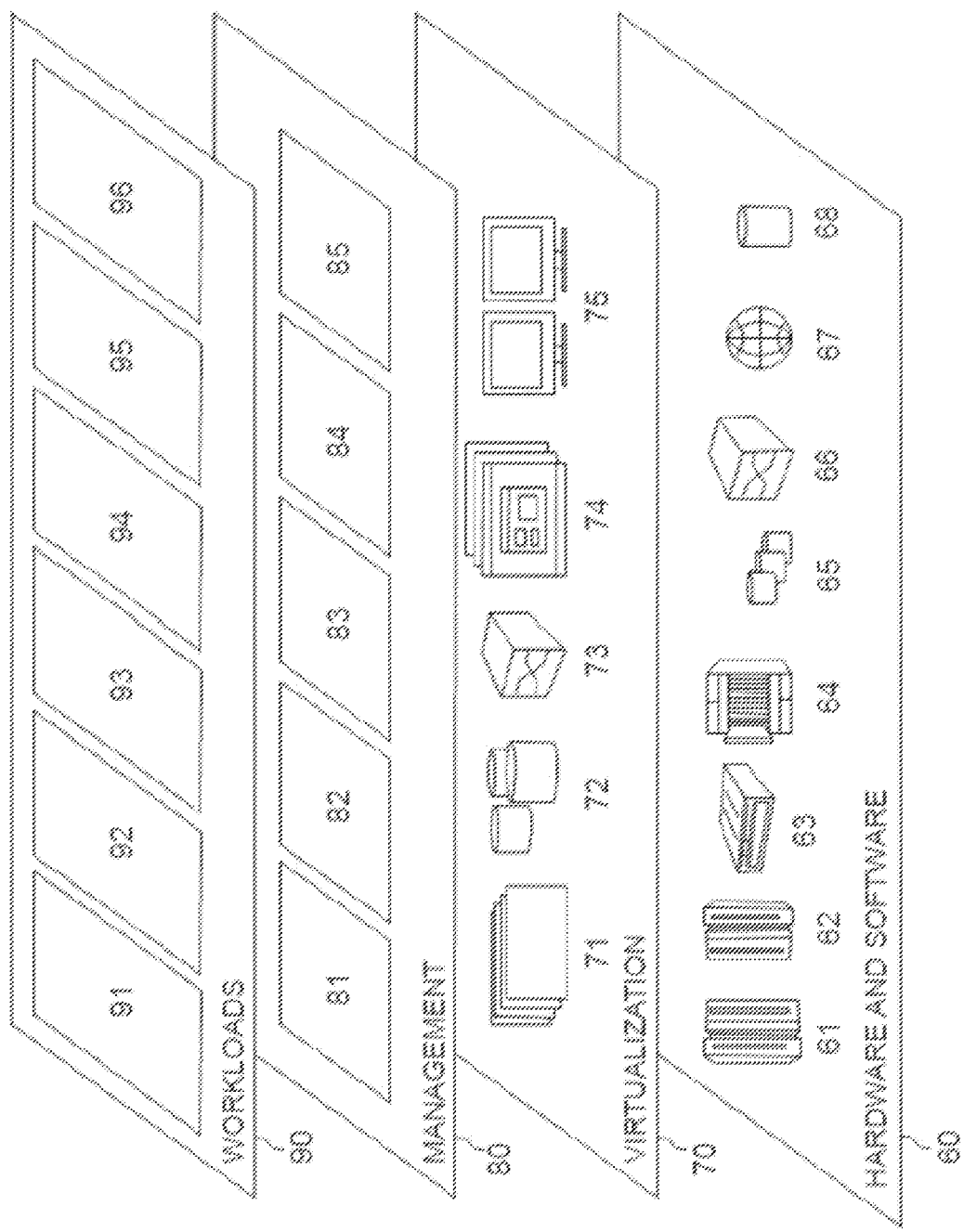
FIG. 14 depicts abstraction model layers according to an embodiment of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and linguistic coordination system 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for matching callers and agents, said method comprising:
   routing a call from a caller to a select agent with a controller, the call being routed based on at least one of a caller profile of the caller and a regional profile,
      the caller profile including call records between the caller and agents, each call record including an agent location, an agent preferred language, and a number of communication barriers experienced during a call with the caller, and
      the regional profile including a number of communication barriers experienced between regional callers and regional agents, the regional callers including callers that share the same nationality and language as the caller, the regional agents including agents that share the same nationality and language as the select agent;
   generating a new call record for the call between the caller and the select agent with a processor, the new call record including caller attributes and agent attributes;

monitoring the call between the caller and the select agent with a detector, the call being monitored for communication barriers, the communication barriers including at least one of:
   at least one of words and phrases that indicate a misunderstanding, and
   repetition of the same phrase; and
updating the caller's profile and the regional profile with the processor, the caller's profile and the regional profile being updated with the new call record.

2. The method according to claim 1, wherein the caller profile includes at least one successful call record with a preferred agent, the successful call record including a number of communication barriers below a predefined threshold, and
   wherein said routing of the call includes routing the caller to the preferred agent.

3. The method according to claim 1, further comprising determining whether a number of call records in the caller profile is above a threshold number of call records.

4. The method according to claim 3, wherein said routing of the call includes routing the caller to the selected agent based on the regional profile when the number of call records in the caller profile is below the threshold number of call records.

5. The method according to claim 3, wherein said routing of the call includes routing the caller to the selected agent based on the caller profile when the number of call records in the caller profile is above the threshold number of call records.

6. The method according to claim 1, further comprising determining whether a caller profile for the caller is stored in a database, wherein said routing of the call includes routing the caller to the selected agent based on the regional profile when a caller profile for the caller is not saved in the database.

7. The method according to claim 1, further comprising storing identified communication barriers in the new call record.

8. The method according to claim 1, further comprising identifying the call between the caller and the select agent as a successful call in the new call record when there are no identified communication barriers.

9. The method according to claim 1, wherein the at least one of words and phrases that indicate a misunderstanding include at least one of:
   would you repeat that,
   please repeat,
   I don't understand,
   what was that,
   huh, and
   what.

10. The method according to claim 1, wherein the at least one of words and phrases that indicate a misunderstanding include a request to be transferred to another agent.

11. A system for matching callers and agents, said system comprising:
   a controller, said controller routes a call from a caller to a select agent based on a caller profile of at least one of the caller and a regional profile,
      the caller profile including call records between the caller and agents, each call record including an agent location, an agent preferred language, and a number of communication barriers experienced during a call with the caller, and
      the regional profile including a number of communication barriers experienced between regional callers and regional agents, the regional callers including callers that share the same nationality and language as the caller, the regional agents including agents that share the same nationality and language as the select agent;
   a processor connected to said controller, said processor generates a new call record for the call between the caller and the select agent, the new call record including caller attributes and agent attributes; and
   a detector connected to said processor, said detector monitors the call between the caller and the select agent for communication barriers, the communication barriers including at least one of:
      at least one of words and phrases that indicate a misunderstanding, and
      repetition of the same phrase,
   said processor update the caller's profile and the regional profile with the new call record.

12. The system according to claim 11, wherein the caller profile includes at least one successful call record with a preferred agent, the successful call record including a number of communication barriers below a predefined threshold, and
   wherein said controller routes the caller to the preferred agent.

13. The system according to claim 11, wherein said processor determines whether a number of call records in the caller profile is above a threshold number of call records.

14. The system according to claim 13, wherein said controller routes the caller to the selected agent based on the regional profile when the number of call records in the caller profile is below the threshold number of call records.

15. The system according to claim 13, wherein said controller routes the caller to the selected agent based on the caller profile when the number of call records in the caller profile is above the threshold.

16. The system according to claim 11, wherein said processor determines whether a caller profile for the caller is stored in an electronic database, wherein said controller routes the caller to the selected agent based on the regional profile when a caller profile for the caller is not saved in the electronic database.

17. The system according to claim 11, wherein said processor stores identified communication barriers in the new call record.

18. The system according to claim 11, wherein said processor identifies the call between the caller and the select agent as a successful call in the new call record when there are no identified communication barriers.

19. The system according to claim 11, wherein the at least one of words and phrases that indicate a misunderstanding include at least one of:
   would you repeat that,
   please repeat,
   I don't understand,
   what was that,
   huh,
   what, and
   a request to be transferred to another agent.

20. A computer program product for matching callers and agents, said computer program product comprising:
   a computer readable storage medium having stored thereon:
   first program instructions executable by a device to cause the device to route a call from a caller to a select agent based on a caller profile of the caller and a regional profile, the caller profile including call records between the caller and agents, each call record including an agent location, an agent preferred language, and a number of communication barriers experienced during a call with the caller, and the regional profile including a number of communication barriers experienced between regional callers and regional agents, the regional callers including callers that share the same nationality and language as the caller, the regional agents including agents that share the same nationality and language as the select agent;

second program instructions executable by the device to cause the device to generate a new call record for the call between the caller and the select agent, the new call record including caller attributes and agent attributes;

third program instructions executable by the device to cause the device to monitor the call between the caller and the select agent for communication barriers, the communication barriers including at least one of:
 words and phrases that indicate a misunderstanding, and
 repetition of the same phrase; and fourth program instructions executable by the device to cause the device to update the caller's profile and the regional profile with the new call record.

* * * * *